June 14, 1960 C. E. ERICKSON 2,940,640
DISTRIBUTOR FOR SEED, FERTILIZER AND THE LIKE
Filed Sept. 9, 1957 2 Sheets-Sheet 2
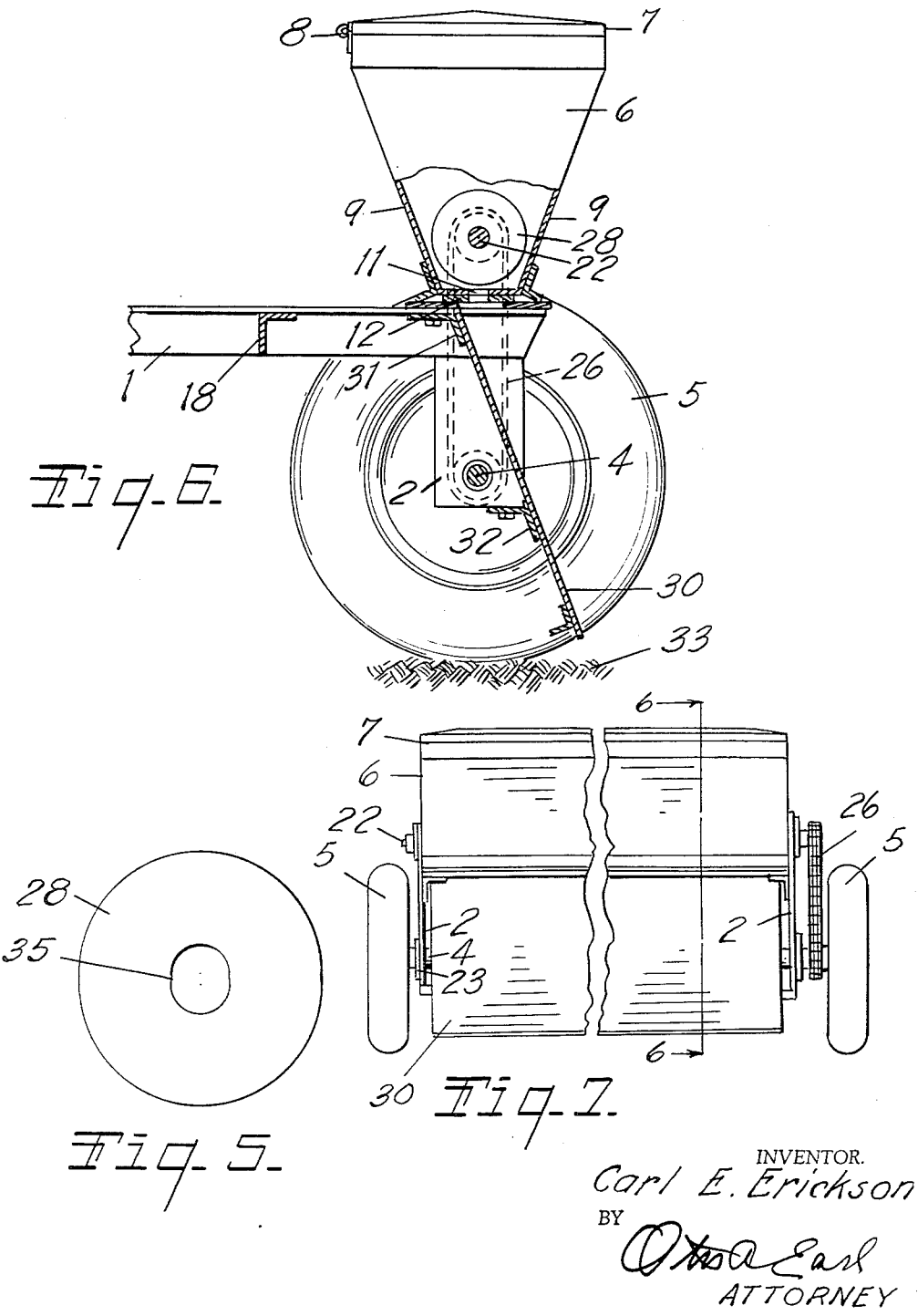
INVENTOR.
Carl E. Erickson
BY
ATTORNEY United States Patent Office 2,940,640
Patented June 14, 1960

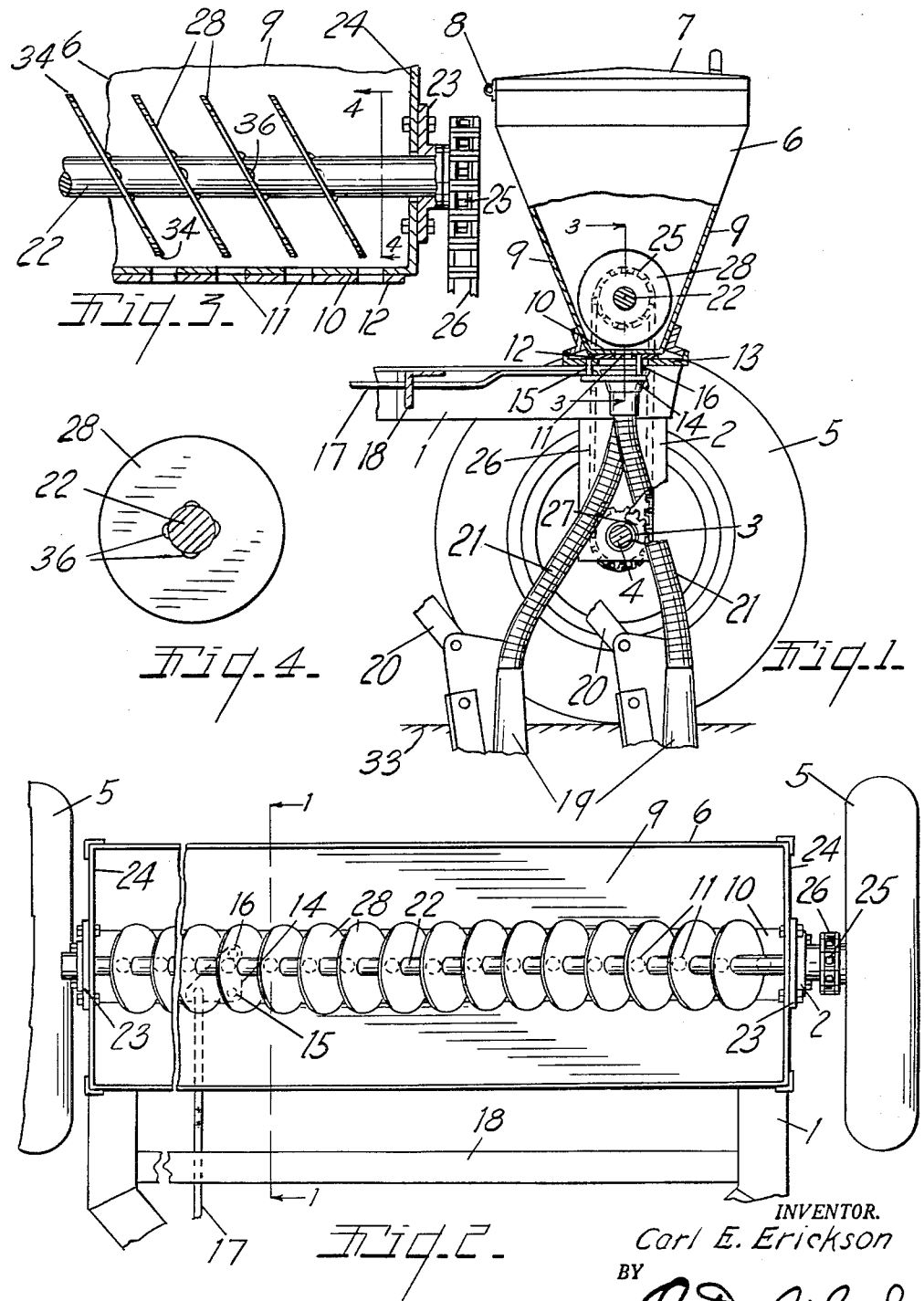

2,940,640

DISTRIBUTOR FOR SEED, FERTILIZER AND THE LIKE

Carl Evar Erickson, 2027 Meadowmere Court, Manhattan, Kans.

Filed Sept. 9, 1957, Ser. No. 682,747

2 Claims. (Cl. 222—177)

This invention relates to distributors for seed, fertilizers, and similar granules or powder-like materials. The main objects of this invention are, First, to provide a distributor which is adapted for distributing various granular or powder-like materials uniformly and without parts being clogged.

Second, to provide a distributing machine having these advantages which is relatively simple in structure and requires no particular skill for the successful operation thereof.

Objects relating to detail and economies of the invention will appear from the description to follow. The invention is defined and pointed out in the claims.

A preferred embodiment of the invention is illustrated in the accompanying drawing, in which:

Fig. 1 is a fragmentary view in vertical section on a line corresponding to line 1—1 of Fig. 2.

Fig. 2 is a fragmentary plan view.

Fig. 3 is a fragmentary view partially in longitudinal section on a line corresponding to line 3—3 of Fig. 1.

Fig. 4 is a fragmentary vertical section on a line corresponding to line 4—4 of Fig. 3.

Fig. 5 is a side view of one of the agitator disks.

Fig. 6 is a fragmentary vertical section on a line corresponding to line 6—6 of Fig. 7 of my distributor with the distributor plate and wind guard thereon.

Fig. 7 is a fragmentary rear elevational view.

In the accompanying drawing only portions of the frame designated generally by the numeral 1 are illustrated. It will be understood that this frame is adapted to be attached to some propelling means.

The frame 1 is provided with depending portions 2 at each side thereof provided with bearings 3 for the axle 4 of the wheels 5, rubber tired wheels being illustrated. The hopper 6 is desirably provided with a cover 7 hinged at 8 of the front edges thereof. The side walls 9 of the hopper are converged downwardly to the bottom 10. The side walls and the bottom desirably have flat interior surfaces. The bottom has a longitudinal series of spaced discharge openings 11 positioned centrally thereof, see Figs. 1 and 2.

The longitudinally slidable valve 12 is slidably supported on the underside of the bottom of the hopper by means of the slideway 13 and is adjusted by means of the adjusting member 14 which is pivoted at 15 on the slideway and provided with an upwardly projecting pin 16 which engages the valve. The control rod 17 projects forwardly through the frame member 18 which serves as a support therefor.

In the embodiment illustrated in Figs. 1 and 2, drill shoes 19 are provided, the shoes being connected to the frame by the draw bars 20. Conduits 21 are positioned to receive the materials discharged from the hopper. The shoes are desirably removed when it is desired to use the machine for other purposes than sowing seed in rows and covering the same. When it is desired to distribute the seed or fertilizer on the surface the distributor plate and wind shield illustrated in Figs. 6 and 7 are desirable. To agitate or stir the material and to distribute it and force it through the discharge openings, an agitator and distributor is provided consisting of a shaft 22 which is supported in bearings 23 on the end walls 24 of the hopper and provided with a sprocket wheel 25 connected by the sprocket chain 26 to a sprocket 27 on the axle 4. A series of flat circular agitator disks 28 are mounted on the shaft 22 in inclined axially spaced relation thereto. These disks are of such diameter relative to the hopper that the edges are quite close to the side walls of the hopper adjacent the lower edges thereof and to the bottom of the hopper. These disks are spaced and inclined so that substantial segments thereof are in overlapping relation to each other, and the discharge holes or openings in the bottom of the hopper. The agitator disks are so spaced relative to each other, that the disks wipe across the discharge openings on each revolution thereof. Desirably the opposite edges of the disks are oppositely beveled as shown in Fig. 3.

The material to be distributed is not commonly poured into the hopper evenly and material, such as certain fertilizers which tend to bank upon and adhere to the hopper walls, is continuously worked or agitated so that it is uniformly discharged through the several hopper discharge openings even when the valves are adjusted to cut down the quantity discharged.

While seed has less tendency to clog in the hopper than certain other materials which the machine is designed to distribute, the uniform distribution thereof throughout the hopper and the discharge through the discharge openings when they are materially reduced in size by adjustment of the valve, is an important factor. Perhaps most fertilizers and certain seeds are broadcast as distinguished from being sown in rows and to aid in broadcast distribution and also to prevent or minimize the effect of wind on light materials I provide the combined distributor and the wind guard plate 30 which extends the full length of the hopper, its upper edge being positioned below the discharge openings of the hopper so that the material discharged therefrom drops or falls upon the distributor plate and is distributed in a broadcast manner as distinguished from rows. The plate 30 is supported at its upper edge by the hanger member 31 and is further supported by the crossbar 32 mounted on the frame members 2. The distributor plate is thus supported in a forwardly inclined position with its lower edge adjacent to but spaced from the ground, conventionally indicated at 33. The plate 30 also serves as a wind guard which is important with light seeds such as grass seed, for example, and powdery fertilizers and greatly aids in the uniform distribution thereof. As stated, the disks 28 which are elliptical in shape as shown in Fig. 5 are disposed at a substantial angle to the shaft 22 and desirably the diametrically opposite edges thereof are oppositely beveled, as shown at 34 in Fig. 3. To facilitate the mounting of the disks at their proper angle the shaft receiving holes 35 thereof are of elliptical shape and of uniform dimensions and may be readily attached in proper spaced relation by spot welds, indicated at 36.

I have illustrated and described my invention in highly simple and practical embodiments thereof which will enable those skilled in the art to adapt the same to machines having other structural features and functions, for example, soil working machines.

Having thus described the invention, what is claimed to be new and is desired to be secured by Letters Patent is:

1. A machine for distributing seed and granular material comprising a wheeled carriage, an elongated hopper supportingly mounted on the carriage transversely thereof and having a flat bottom and downwardly converging side walls, the bottom having a series of longitudinally spaced discharge openings therein, a valve for said openings reciprocatingly mounted on the underside of said hopper bottom, an agitator shaft having driving connections to one of the wheels of the carriage disposed within the hopper to extend longitudinally thereof and in substantially uniformly spaced relation to the bottom and downwardly converging side walls of the hopper, and a series of elliptical planer material agitating and feeding blades disposed on said shaft in inclined relation to its axis and in parallel relation to each other, said blades being spaced so that substantial segments of each blade are in overlapping relation to the adjacent blades, the blades being elliptical to such degree and dimensioned relative to the hopper so that the edges thereof are closely adjacent to and in substantially the same spaced relation to the bottom and side walls of the hopper in all rotative positions of the blades, the blades being so spaced and positioned on the shaft relative to the hopper discharge openings that two adjacent blades alternately sweep across each discharge opening in opposite directions relative thereto on each rotation of the shaft.

2. A machine for distributing seed and granular material comprising a carriage, an elongated hopper supportingly mounted on the carriage transversely thereof and having a flat bottom and downwardly converging side walls, the bottom having a series of longitudinally spaced discharge openings therein, a valve for said openings reciprocatingly mounted on the underside of said hopper bottom, a driven agitator shaft disposed within the hopper to extend longitudinally thereof and in substantially uniformly spaced relation to the bottom and the downwardly converging side walls of the hopper, and a series of flat, disk-like elliptical material agitating and feeding blades disposed on said shaft in inclined relation to its axis and in parallel relation to each other, said blades being spaced so that substantial segments of each blade are in overlapping relation to the adjacent blades, the blades being of such size and degree of eccentricity that the edges thereof are closely adjacent and in substantially the same spaced relation to walls of the hopper in all rotative positions of the blades, the blades being so spaced and positioned on the shaft relative to the hopper discharge openings so that two adjacent blades alternately sweep across and closely adjacent each bottom wall discharge opening and in opposite directions relative thereto on each rotation of the shafts.

References Cited in the file of this patent
UNITED STATES PATENTS

| | | |
|---|---|---|
| 1,573,493 | Heyd | Feb. 16, 1926 |
| 1,948,861 | Lindengren | Feb. 27, 1934 |
| 2,522,693 | Stiteler | Sept. 19, 1950 |
| 2,703,193 | Seltzer | Mar. 1, 1955 |
| 2,819,822 | Slokland | Jan. 14, 1958 |